Aug. 20, 1929.  L. C. WETZEL  1,725,499
WEIGHING SCALE
Filed Jan. 24, 1927
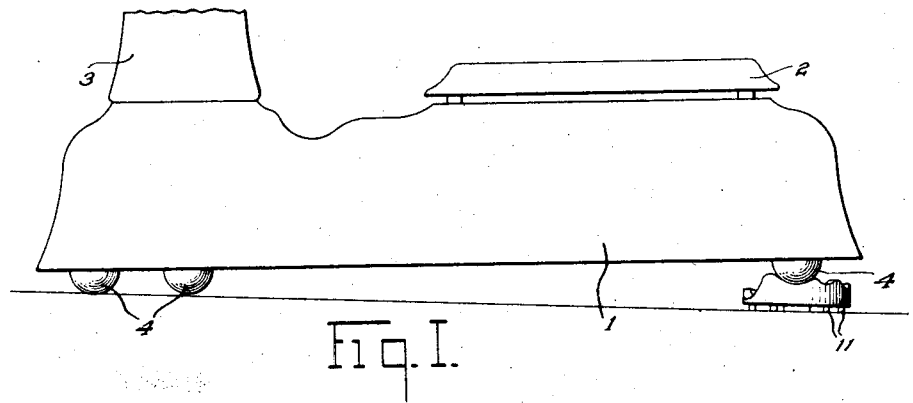
Fig. I.
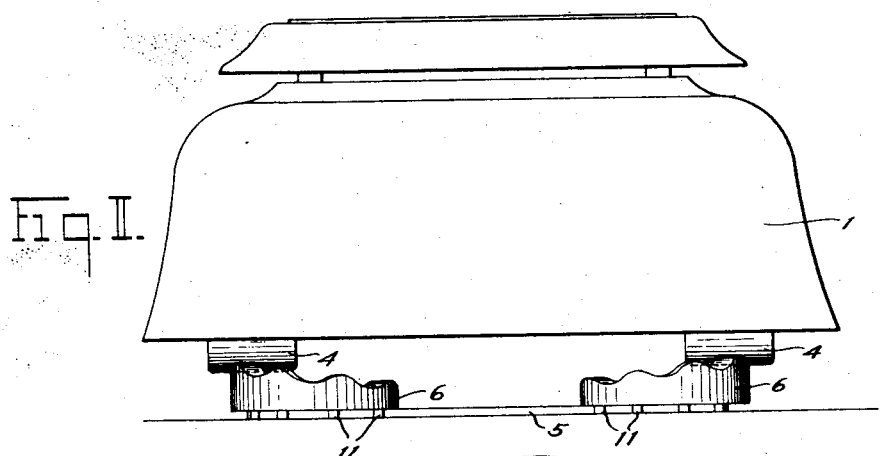
Fig. II.
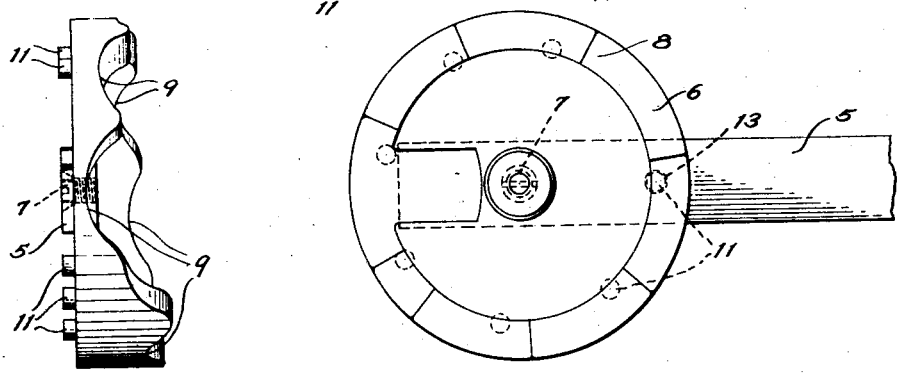
Fig. IV.    Fig. III.
Inventor
LEWIS C. WETZEL
By C. O. Marshall
Attorney Patented Aug. 20, 1929.

1,725,499

UNITED STATES PATENT OFFICE.

LEWIS C. WETZEL, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed January 24, 1927. Serial No. 163,011.

This invention relates to weighing scales, and more particularly to devices for leveling scales when they are positioned upon sloping or uneven surfaces.

One of the principal objects of this invention is the provision of simple and effective means for substantially leveling scales that are placed upon sloping or uneven floors or benches.

Another object is the provision of a leveling device of this character which is capable of adjustment to several positions.

Still another object is the provision of a device of this kind which is neat and finished in appearance and does not project beyond the outline of the scale base structure.

Still a further object is the provision of a leveling device which may be easily and quickly adjusted to level the scale and which may be positively locked in the adjusted position.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevational view of the base of a person weighing scale showing the leveling device of my invention in use therewith;

Figure II is an enlarged front view of the scale base and leveling device shown in Figure I;

Figure III is an enlarged fragmentary top plan view of a portion of the leveling device of my invention;

Figure IV is an end elevational view of the parts illustrated in Figure III.

Referring to the drawings in detail, I have illustrated my device as used in conjunction with a person weighing machine mounted upon rollers. However, it is to be understood that my device is susceptible to change and modification so as to be made suitable for use with any type of portable scale, whether equipped with rollers or not. As the scale forms no part of the present invention per se, I will describe it only in such detail as to show the connection of my invention therewith.

The base 1 of the scale is substantially hollow and supports and houses platform lever mechanism (not shown) carrying a platform 2 of dimensions suitable for a person to stand upon while being weighed. Erected upon the rear of the base 1 is a column 3 (a portion of which is shown) which supports the load-counterbalancing and indicating mechanism (not shown), the general construction of the scale being of the type shown in Design Pat. No. 48,914, issued to O. C. Reeves. The scale is provided with a plurality of supporting rollers 4 to facilitate moving the scale.

Scales of this type are sometimes placed in corridors, entranceways, etc. where the floor is sloping or ramp-like, and in such cases the slope of the floor throws the scale out of level, which prevents it from weighing accurately. To obviate these difficulties I have provided an adjustable leveling device which may be used to support the scale in a substantially level position when the degree of slope of the supporting surface is not excessive. The device consists of a supporting bar 5 which is adapted to be secured at each end to a circular disk-like member 6 by means of screws 7. Each disk-like member 6 is provided with a peripheral flange 8 formed with a plurality of depressions 9 which are of a contour suitable to receive the supporting rollers 4 of the scale. The depressions 9 of the members 6 are of progressively varying depths so that one end of the scale may be elevated to varying heights depending upon the degree of slope of the floor to bring the scale to a substantially level position. The members 6 are formed with a plurality of spaced pins or projections 11 which are used for properly positioning the members 1 with respect to the bar 5. This bar is provided with an opening 13 which is adapted to selectively receive one of the pins 11 when the screw 7 is partially withdrawn. It is readily apparent that by loosening the screw 7 the member 6 may be slightly elevated above the bar 5, thus withdrawing one of the pins 11 from the opening 13. The member 6 may then be rotated about the screw 7 and in this way selectively bring any of the depressions 9 into alignment with the bar 5, one of the pins 11 again registering with the opening 13. The screw 7 may then be drawn up, thus positively locking the member 6 against accidental displacement relative to the bar 5. The remainder of the pins 11 serve to make the device more stable when it is placed under a scale, as the extremities of the pins are in engagement with the floor or supporting surface and thus tend to prevent tipping or sliding of the scale.

In the use of my device it is first necessary to approximately determine how much one end of the scale must be raised in order to level the same. Then the screws 7 may be loosened and the supporting members 6 rotated until the depressions 9 of the proper depth are in alignment with the bar 5 and the screws 7 drawn up. The device may then be placed beneath the rollers 4 or other suitable projecting portion of the scale, as particularly shown in Figures I and II, to elevate the same into a level position.

As it is obvious from the foregoing that the scale must be elevated in steps equal in measurement to the difference in height between adjacent depressions in the members 6, it would sometimes be impossible to elevate the scale to an exact level position, as the difference in the distances from the floor to the base of any two adjacent depressions in the member 6 may be greater or less than that required to elevate the scale to an exact level position. However, it is not absolutely necessary to have the scale exactly level, but it is essential that it be substantially level in order to insure the successful operation of the scale.

The embodiment of my invention herein shown and described is to be regarded as illustrative only, and it is to be understood that the invention is susceptible to variation, modification and change within the spirit and scope of the subjoined claims.

Having described my invention, I claim:

1. In the combination of a leveling device, a pair of identical members each formed with a series of depressions of progressively varying depth, an element connecting said members, said members being capable of adjustment relative to said connecting element, and locking means for securing said members in adjusted position.

2. In a leveling device for weighing scales, in combination, a plurality of substantially circular members formed with a series of depressions of progressively varying depth, and means including a bar connecting said members, the latter being adjustable relative to the bar to selectively render the depressions in said members available to support an article.

3. In a leveling device for weighing scales, in combination, a plurality of substantially circular members having peripheral flanges, said flanges being formed with a series of depressions of progressively varying depths, means for connecting said members including a bar, said members being relatively adjustable with respect to said bar, and locking means whereby said members may be secured justed position.

4. In a leveling device for weighing scales, in combination, a pair of members each having a plurality of depressions of progressively varying depths, a bar connecting said members, co-operative means between said bar and said members for selectively positioning the members so as to render the proper depressions available for use, and means for securing the members to said bar in adjusted position.

5. In a leveling device for weighing scales, in combination, a pair of substantially circular members, each having an upright circular flange with a plurality of depressions of progressively varying depths, a bar connecting said circular members, co-operative means between said bar and said members for positioning said members in selective angularly adjusted positions, and means for securing said members at their centers to the ends of said bar.

LEWIS C. WETZEL.